United States Patent [19]

Barrett

[11] Patent Number: 5,406,331
[45] Date of Patent: Apr. 11, 1995

[54] DIGITAL CAMERA FOR RECORDING COLOR IMAGES

[76] Inventor: Jon S. Barrett, 21601 Mayan Dr., Chatsworth, Calif. 91311

[21] Appl. No.: 2,939

[22] Filed: Jan. 11, 1993

[51] Int. Cl.$^6$ .............................................. H04N 9/04
[52] U.S. Cl. .................................. 348/268; 348/270; 348/317
[58] Field of Search ...................... 358/42, 43, 41, 44, 358/98; H04N 7/18, 9/04; 128/4–6; 348/65, 70, 230, 231, 268, 269, 270, 271, 272, 273, 317, 319

[56] References Cited

U.S. PATENT DOCUMENTS

| | | | |
|---|---|---|---|
| 4,404,585 | 9/1983 | Hjortzberg | 358/42 |
| 4,667,229 | 5/1987 | Cooper et al. | 358/98 |
| 4,714,683 | 12/1987 | Fujimori et al. | 358/98 |
| 4,769,693 | 9/1988 | Kato | 358/42 |

*Primary Examiner*—James J. Groody
*Assistant Examiner*—Michael H. Lee
*Attorney, Agent, or Firm*—E. T. Barrett

[57] ABSTRACT

A method of operation for a digital color camera permits the rapid accumulation of three basic color images that can be combined into a full-color reproduction. The scene to be captured is focused through a blue filter onto the active array of a conventional frame transfer CCD. The data representing the received image is condensed, by summing or bining, to reduce the number of pixels representing the image, and is transferred to the storage array of the CCD where it occupies one-half of the available storage area. The first exposure of the active array is terminated by a filter/shutter mechanism that also serves to replace the blue filter with a red one. The scene is then focused on the active array through the red filter and the exposure again terminated by the filter/shutter assembly. The data representing this image are then summed or bined to reduce the number of pixels representing the image and the data is transferred to the unoccupied one-half of the storage array. The scene is then focused through a green filter onto the active array and the exposure is terminated by an opaque section of the filter/shutter mechanism. The data representing this image is not summed or bined, and the active area of the CCD serves as a storage area for the image. After the data in the storage area has been transferred to the digitizing and processing circuits, the data in the active area is transferred with full resolution to the now empty storage area. Advantage is taken of certain characteristics of the human eye that permit resolution to be sacrificed in certain color segments while retaining overall acceptable image quality.

7 Claims, 1 Drawing Sheet

DIGITAL CAMERA FOR RECORDING COLOR IMAGES

BACKGROUND OF THE INVENTION

1. Field of the Invention

This invention relates to a digital color camera in which an image recording device stores three rapidly sequenced color images in two frames of the image recording device.

2. Description of Related Art

It has long been the practice to form a single colored image from three successive exposures using different color filters for each exposure. For example, a first image may be captured by exposing the imaging surface to the scene through a blue filter, a second image can be captured using a red filter and the third using a green filter. The three images can then be combined to produce a single full color image. The practical use of such a procedure with many image recording devices is limited because of the time required to make the three exposures. The practical use of sequential imaging requires that the images be taken in a period of time short enough that there is no significant change in the scene being recorded.

SUMMARY OF THE INVENTION

A mode of operation for a digital color camera permits the rapid accumulation of three basic color images that can be combined into a quality full-color reproduction. Advantage is taken of certain characteristics of the human eye that permit resolution to be sacrificed in certain color segments while retaining overall acceptable image quality.

The scene to be captured is focused through a color filter onto the active array of a conventional frame transfer charge-coupled device (CCD). The data representing the received image is condensed, by summing or bining, to reduce the number of pixels representing the image, and is transferred to the storage array of the CCD where it occupies one-half of the available storage area. The first exposure of the active array is terminated by a filter/shutter mechanism that also serves to replace the first color filter with a second one having different color characteristics. The scene is then focused on the active array through the second color filter and the exposure again terminated by the filter/shutter assembly. The data representing this image are then summed or bined to reduce the number of pixels representing the image and the data is transferred to the unoccupied one-half of the storage array. The scene is then focused through a third color filter onto the active array and the exposure is terminated by an opaque section of the filter/shutter mechanism. The data representing this image is not summed or bined, and the active area of the CCD serves as a storage area for the image. After the data in the storage area has been transferred to the digitizing and processing circuits, the data in the active area is transferred with full resolution to the now empty storage area. This operating procedure permits the three images to be captured rapidly so there is minimal disturbance of the image being captured during the exposure process. In a typical example, the first filter is blue, the second is red and the third is green (or eye-response green or clear). The first two images control the chromanence or color distribution and the third image controls the luminance or brightness of the final reproduction.

DESCRIPTION OF THE PREFERRED EMBODIMENT

Figure 1:
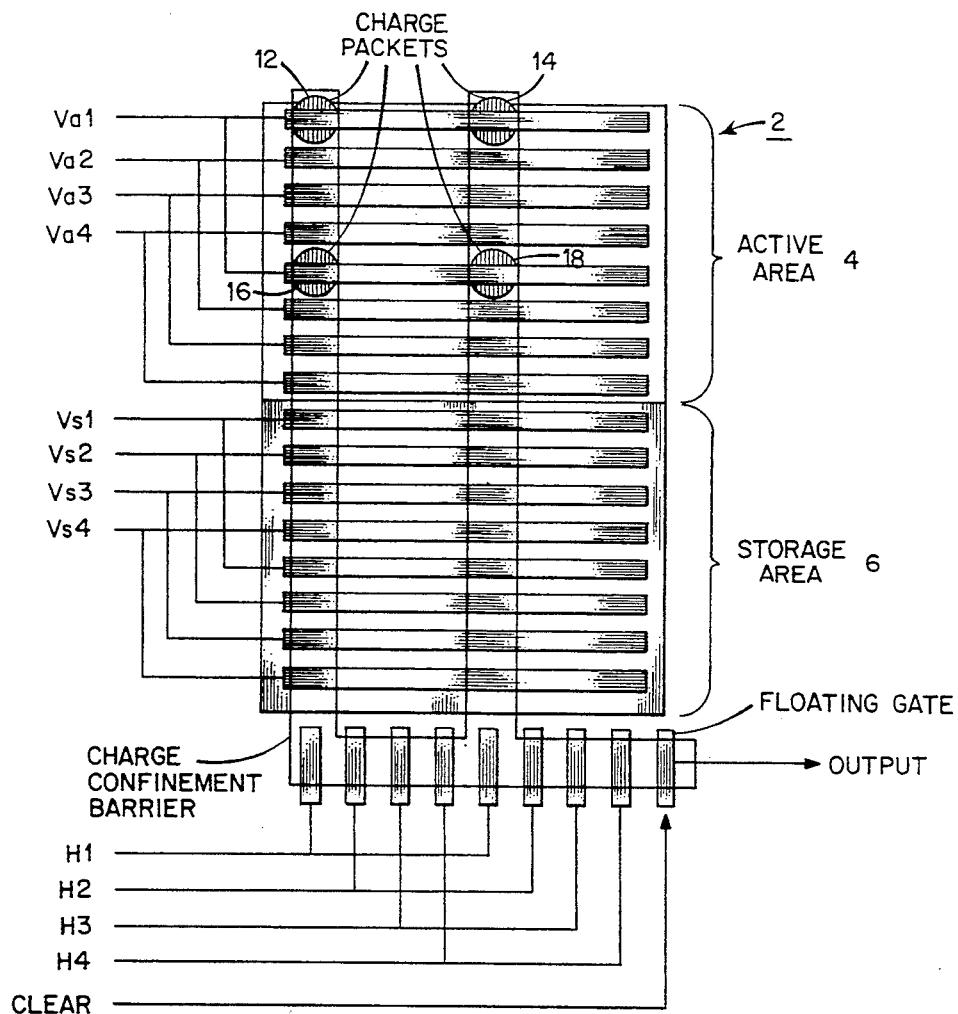
FIG. 1 is a simplified diagrammatic illustration of a frame transfer CCD.

A primary object of the present invention is to make use of a standard television CCD to record color images by minimizing the time required to capture the three colored images. The usual CCD, designed for use in television cameras, will store only one field, or two with the addition of a shutter. The usual television CCD has two image areas: a first active area that converts the photons to an electric charge and integrates the charges into individual discrete packets, and a second storage area that retains the packets from one field of a previous exposure. The packets from the active area are transferred quickly to the storage area. The packets from the storage area are read out sequentially to form one field of the television raster, while the next field is being accumulated in the active area. It is possible to use the active area of the CCD as a storage area by providing a shutter to terminate the exposure.

The time required to read out the charge packets that compose one field in the CCD is substantially longer than the time required to transfer the packets from the active area to the storage area or even the time required to close a mechanical shutter. Most CCD's that are designed for television use, read out the charge packets forming one television field in approximately 16 milliseconds. A mechanical shutter is readily closed in only one millisecond and the charge packets in the active area can be transferred to the storage area in a few microseconds.

A standard television CCD can be used, with the addition of a mechanical shutter, to quickly capture two images—but good sequential color pictures require three colored images. One possible solution for this problem is to design the CCD with a larger storage area to permit three images to be stored in the CCD. This would require a special and larger CCD and significantly increase the cost. Another alternative is read out the first image from the storage area before the third image is captured. However, that would significantly increase the minimum time between the successive pictures.

There are two primary categories of CCD imaging devices: the interline transfer CCD and the frame transfer CCD. The interline transfer CCD embeds the active array in the storage area and the storage area also transfers the charge packets to the CCD output. The storage/transfer area forms columns between the columns of integrating detectors. Each column of the storage array is covered by a strip of opaque material to reduce the sensitivity to light. At the end of the integration period, all of the integrated charge packets are moved in parallel and in one step into the storage array.

The frame transfer, which actually transfers fields from the imaging or active area to the storage area and then to the output, uses an array of columns of CCD charge transport serial shift registers both to integrate the image and to transfer the charge packets to the storage area. At the end of the integration interval, the charges are clocked in parallel down the shift registers into the storage array. The storage array is almost identical with the active array but it is covered with an opaque material. Before the next integrating cycle can begin, all of the columns of the CCD must be clocked repeatedly until all of the charge packets have been moved to the opaque area. There must be as many clock cycles as there are charge packets in a column. The usual frame transfer CCD can transfer all of the charge packets to storage in about 100 microseconds.

In a color image, because of the characteristics of the human eye, the color information may have a lower resolution than the luminance information without noticeable degradation of the image. In a red-blue-green (RGB) image, the eye is more sensitive to the resolution of the green image than either the red or the blue. This is particularly true if the green channel of the detector matches the response, as a function of wavelength, of the so-called green detectors of the eye, which include sensitivity to red light. It is also possible to form a good color image from a white image (no filter) and lower resolution red and blue images.

By taking advantage of these characteristics of the human eye, a conventional frame transfer CCD can be used to acquire rapidly the three images for a color picture. It is possible to simultaneously move the integrated charge packet from the imaging array to the storage array and to sum pairs of packets so there only one-half as many packets in the storage area as there were in the active area. The packets will fill only one-half of the storage area. By this summing (sometimes called bining) of the charges it is possible to simultaneously store two half-field images and one full-field image and to create an acceptable color reproduction.

The first two pictures (with reduced resolution) are used to control the color distribution and the final full-field image is used to control the luminance or brightness of the picture elements. Typically, the first two one-half field images are red and blue. The full-field image is either white or green, or it may be eye-response green, which includes considerable red and some blue.

FIG. 1 is a simplified illustration of a frame transfer CCD, generally indicated at 2, having an active area 4, where the charge packets record the exposed image, and a storage area 6 where the charge packets are stored pending read out to the data processing circuits. The active area includes many light sensing points where discrete charges are created by exposure to the incoming light. The distribution of charges on this imaging or active array thus represents the light image that is focused on the array.

For use as a television detector, a frame transfer CCD must have separate clocks for the integration and storage areas. When the integrated packets are transferred from the active array to the storage array, the arrays are clocked together, and could have a common clock structure. However, after this transfer to the storage area, the storage area is clocked more slowly to read out the charge packets while the active area integrates the next image. The active area must not be clocked during integration.

FIG. 1 shows only four charge packets 12, 14, 16 and 18. However, In a typical CCD there may be, for example, some 90,000 individual charge packets each representing one pixel of the image. Three sets of four clocks each are provided that control the operations of the CCD. These clock structures are conventional and are well known in the field. A first set of clocks indicated at Va1, Va2, Va3 and Va4 transfer the charge packets vertically from one row to the next while maintaining the charge packets in the same columns. For example, to hold the charges (in this example the charges are photoelectrons) as they are shown in FIG. 1, the clock Va1 must be high (positive) and Va2, Va3 and Va4 must be low (negative or neutral). To move all of the charges in the active area (12, 14, 16 and 18) down one row, Va2 is made high and then Va1 is made low. To move down another row, Va3 is made high and Va2 is made low. This process is repeated until all charge packets are transferred to the storage area 6.

The charge packets, as they are received in the storage area, are moved vertically in the same manner by the second set of clocks Vs1, Vs2, Vs3 and Vs4. The charge packets are then read out by the clocks H1, H2, H3 and H4 which move the charge packets horizontally as they are transferred by the Vs clocks to the lowermost row. Thus, upon completion of the exposure to the focused image, which creates the appropriate charge packets in the active area of the CCD, the charges are shifted vertically by the Va clocks, then by the Vs clocks and finally horizontally by the H clocks.

The steps for creating a stored digital color image are as follows: First, the exposure time is determined by conventional means. The CCD is cleared of all charge packets before the new exposure. This may be accomplished by conventional means, for example, by reverse clocking both the active and storage areas of the CCD. Reverse clocking then transports all charges from the top row of the CCD to a conventional overflow drain.

Figure 2:
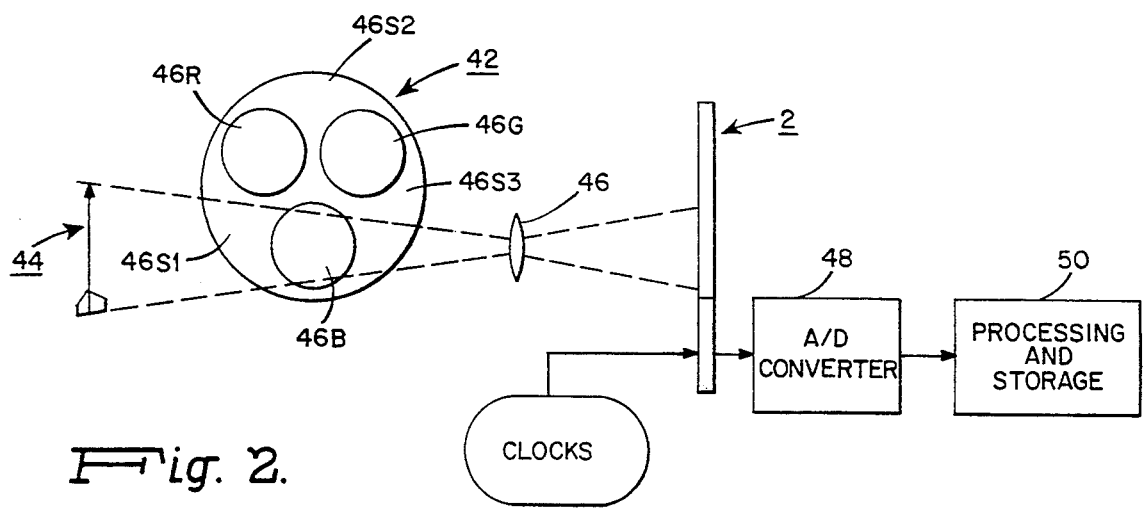
FIG. 2 is a diagrammatic sketch illustrating the operation of the color camera embodying the invention.

A shutter/filter mechanism (FIG. 2), generally indicated at 42, is positioned in the optical path between the object 44 to be captured and a lens 46 that focuses the image on the active area 4 of the CCD 2. The CCD is then exposed through a blue filter 46B for the requisite time determined by the previous exposure measurement. The duration of the exposure may be controlled by the shutter/filter mechanism 42 which includes also the red filter 46R and the green filter 46G. Intervening sections 46S1, 46S2 and 46S3 of the shutter/filter mechanism 42 serve to control the duration of each exposure. For example, the blue exposure is terminated by rotating the shutter/filter mechanism 46 so that the opaque section 46S1 interrupts the optical path between the object 44 and the CCD 2. This opaque shutter shields the CCD from exposure during the time the charge packets of the blue image are being transferred from the active area 4 to the storage area 6.

The integrated charges on the active area 4 of the CCD 2 are transferred to the storage area 6 while summing or bining the charge packets so there only one-half as many packets in the storage array 6 as there were in the active array 4. The clocks Va1–Va4 move all of the charge packets in the active area 4 row-by-row downward to the storage area 6. However, the clocks Vs1–vs4 in the storage area move the packets downward in the storage area at only one-half the rate of the movement in the active area. That is, after the bottom row of charges in the active area 4 is transferred to the top row of the storage area 6, the clocks Va1–Va4 act to move the next row from the active area into the storage area. However, during this period, the charges in the storage area 6 are not moved so that two rows of charges from the active area are combined into a single row in the storage area. In the next succeeding step, the clocks move the charges in both the active and storage areas downward one row. Then again the clocks Va1—

Va4 in the active area move an additional row of charges from the active area into the storage area storing two rows of charges from the active area in a single row in the storage area. When the clocking is completed, the CCD active area 4 will be clear and the charge packets will occupy only the top half of the storage area 6 of the CCD 2.

The exposure time for the blue image may be decreased from that indicated by the conventional exposure determination. This reduces the chance of saturation of portions of the image and reduces the overall exposure time. Also the bining process, as described, further reduces the required exposure time.

To minimize the total exposure time, the shutter/mechanism 42 is moving during the period the charges representing the blue image are being transferred from the active to the storage area. Immediately upon the conclusion of the transfer of the packets representing the blue image, the red filter 46R has moved into the optical path to expose the active area of the CCD to the red image.

The red exposure is terminated by the movement of the opaque section 46S2 into the optical path in the same manner as with the blue image. The charges from the red image are summed and transferred to the storage area, in the manner described above so that the charge packets from the red area occupy the top half of the storage area and the charge packets from the blue exposure will have been moved to the bottom half of the storage area. After the packets from the two exposures have been transferred to the storage area, the active area is exposed to light through the green filter and then the shutter is closed.

The total time for the three exposures is not dependent upon the time required to transfer the charge packets to the analog-to-digital converter and processing circuits as no charges need to be removed from the CCD until all three exposures have been completed.

Other known methods of combining charges may be used, the important element being that the total number of charge packets stored in the storage area be significantly less than those acquired in the active area during the blue and red exposures.

The charge packets from the storage area are transferred through an analog-to-digital converter 48 to conventional storage and processing circuits 50. After the charges from the blue and red exposures have been transferred to the processing and storage circuits 50, the charge packets from the green exposure are transferred from the active area 4 to the storage area 6 and then to the processing and storage circuits 50.

I claim:

1. In a digital color camera, the method of acquiring and storing data representing a scene to be captured comprising the steps of
    providing a CCD having
        a charge accumulation area formed by light sensitive points each capable of accumulating an electrical charge corresponding to the intensity of the light to which it is exposed, and
        a charge storage area for receiving and storing electrical charges from said charge accumulation area,
    focusing the light from said scene upon said charge accumulation area while filtering the light to selectively transmit a first light spectrum thereby generating a first set of charges,
    transferring said first set of charges to said storage area while simultaneously reducing the resolution thereby to store said first set of charges in less than the full capacity of said storage area,
    focusing the light from said scene onto said charge accumulation area while filtering the light to selectively transmit a second light spectrum thereby generating a second set of charges,
    transferring said second set of charges to said storage area while simultaneously reducing the resolution thereby to store the second set of charges within the space remaining in said storage area after storage of said first set of charges,
    focusing the light from said scene onto said charge accumulation area thereby generating a third set of charges,
    terminating the exposure of said charge accumulation area to light from said scene by interrupting the optical path between said scene and said charge accumulation area,
    providing a digital data processor for storing data corresponding to the first, second, and third set of charges from said CCD,
    transferring said first and second sets of charges from said storage area to said data processor, and
    transferring said third set of charges from said accumulation area to said data processor.

2. The method as claimed in claim 1 including the step of
    filtering the light from said scene to selectively transmit a third light spectrum while generating said third set of charges.

3. The method as claimed in claim 2 including
    providing a filter/shutter mechanism having at least two colored filters with an opaque section adjacent thereto, and wherein
    the termination of the exposure of said charge accumulation area includes the step of
    intercepting the optical path between said scene and said charge accumulation area by said opaque section.

4. The method as claimed in claim 3 wherein
    said light spectrums respectively selectively transmit light wavelengths to permit selective passage of (i) red wavelengths through one of said filtering steps, (ii) blue wavelengths through another of said filtering steps, and (iii) green wavelengths through the other of said filtering steps.

5. The method as claimed in claim 4 wherein
    each of said exposures is terminated by said opaque section of said filter/shutter mechanism.

6. The method as claimed in claim 2 wherein
    said first light spectrum selectively transmits the light to permit transmission of blue wavelengths.

7. The method as claimed in claim 2 wherein
    successive pairs of said charges from said first set of charges are transferred to a common point in said storage area whereby the total number of said charges from said first set of charges is reduced by one-half when stored in said storage area.

* * * * *